(12) United States Patent
Brandmair et al.

(10) Patent No.: US 12,427,475 B2
(45) Date of Patent: Sep. 30, 2025

(54) EXHAUST GAS TREATMENT SYSTEM FOR AN AMMONIA-CONTAINING EXHAUST GAS

(71) Applicants: Johnson Matthey Public Limited Company, London (GB); Johnson Matthey Catalysts (Germany) GmbH, Redwitz an der Rodach (DE)

(72) Inventors: Maria Theresia Brandmair, Redwitz an der Rodach (DE); Joseph Fedeyko, Wayne, PA (US); Simon Knoll, Redwitz an der Rodach (DE); Tilman Knorr, Redwitz an der Rodach (DE)

(73) Assignees: Johnson Matthey Public Limited Company, London (GB); Johnson Matthey Catalysts (Germany) GmbH, Redwitz an der Rodach (DE)

( * ) Notice: Subject to any disclaimer, the term of this patent is extended or adjusted under 35 U.S.C. 154(b) by 433 days.

(21) Appl. No.: 18/163,940

(22) Filed: Feb. 3, 2023

(65) Prior Publication Data

US 2023/0249126 A1 Aug. 10, 2023

Related U.S. Application Data

(60) Provisional application No. 63/267,678, filed on Feb. 8, 2022.

(51) Int. Cl.
*B01D 53/04* (2006.01)
*B01D 53/58* (2006.01)
*B01J 20/18* (2006.01)

(52) U.S. Cl.
CPC ......... *B01D 53/58* (2013.01); *B01D 53/0438* (2013.01); *B01D 53/0446* (2013.01); *B01D 53/0454* (2013.01); *B01D 2253/108* (2013.01); *B01D 2258/0266* (2013.01); *B01D 2259/402* (2013.01)

(58) Field of Classification Search
CPC ................ B01D 53/58; B01D 53/0438; B01D 53/0446; B01D 53/0454; B01D 2253/108;
(Continued)

(56) References Cited

U.S. PATENT DOCUMENTS 5,019,667 A 5/1991 Chao
5,948,142 A 9/1999 Holmes
(Continued)

FOREIGN PATENT DOCUMENTS

CN 106413892 A 2/2017
CN 107583649 A 1/2018
(Continued)

*Primary Examiner* — Frank M Lawrence, Jr.
(74) *Attorney, Agent, or Firm* — BakerHostetler

(57) ABSTRACT

A method and exhaust gas treatment system for treating an ammonia-containing exhaust gas, for example a livestock house exhaust gas. The exhaust gas treatment system comprises a plurality of sorbent beds comprising a copper-doped small-pore zeolite, a valve system configured to establish independently for each sorbent bed fluid communication in a first or second configuration, wherein in the first configuration a flow of ammonia-containing exhaust gas contacts the sorbent bed at a temperature of less than 50° C. for storing the ammonia; and in the second configuration a flow of heated gas maintains the sorbent bed at a temperature of at least 300° C. for releasing and treating the ammonia in situ.

18 Claims, 1 Drawing Sheet

(58) Field of Classification Search
CPC ...... B01D 2258/0266; B01D 2259/402; B01D 2257/406; B01D 2257/80; B01D 2259/40003; B01D 2259/40009; B01D 2259/4009; B01D 53/0462; B01D 53/04; B01D 53/46; B01D 53/48; B01D 53/52; B01D 53/523; B01D 53/64; B01D 53/68; B01D 53/73; B01J 2220/56; B01J 2220/606; B01J 20/186; B01J 20/2804; B01J 20/28045; B01J 20/3408; B01J 20/3483; B01J 20/16; B01J 20/165; B01J 20/18; B01J 20/183
USPC .... 95/114, 115, 117, 128; 96/121, 132, 134, 96/126, 146, 153; 423/237, 239.1
See application file for complete search history.

(56) References Cited

U.S. PATENT DOCUMENTS

| | | | |
|---|---|---|---|
| 9,849,423 | B2 | 12/2017 | Chiffey et al. |
| 10,155,197 | B2 | 12/2018 | Cole et al. |
| 10,807,082 | B2 | 10/2020 | Fedeyko et al. |
| 11,207,641 | B2 | 12/2021 | Hayama |
| 11,654,395 | B2 | 5/2023 | Hayama |
| 2009/0274617 | A1* | 11/2009 | Yuasa ................ B01J 20/186 423/713 |
| 2012/0006195 | A1 | 1/2012 | Subir |
| 2015/0118138 | A1 | 4/2015 | Jung |
| 2022/0040637 | A1* | 2/2022 | Fedeyko ............. B01D 53/04 |

FOREIGN PATENT DOCUMENTS

| | | |
|---|---|---|
| CN | 108472588 A | 8/2018 |
| CN | 111565842 A | 8/2020 |
| CN | 111601657 A | 8/2020 |
| CN | 109926033 A | 12/2020 |
| DE | 4427491 A1 | 3/1996 |
| EP | 3096878 B1 | 5/2019 |
| EP | 2581127 B1 | 7/2020 |
| JP | 2003311148 A | 11/2003 |
| TW | 200413083 A | 8/2004 |
| WO | 0040324 W | 7/2000 |
| WO | 2020227455 A1 | 11/2020 |
| WO | 2022033972 A1 | 2/2022 |

* cited by examiner

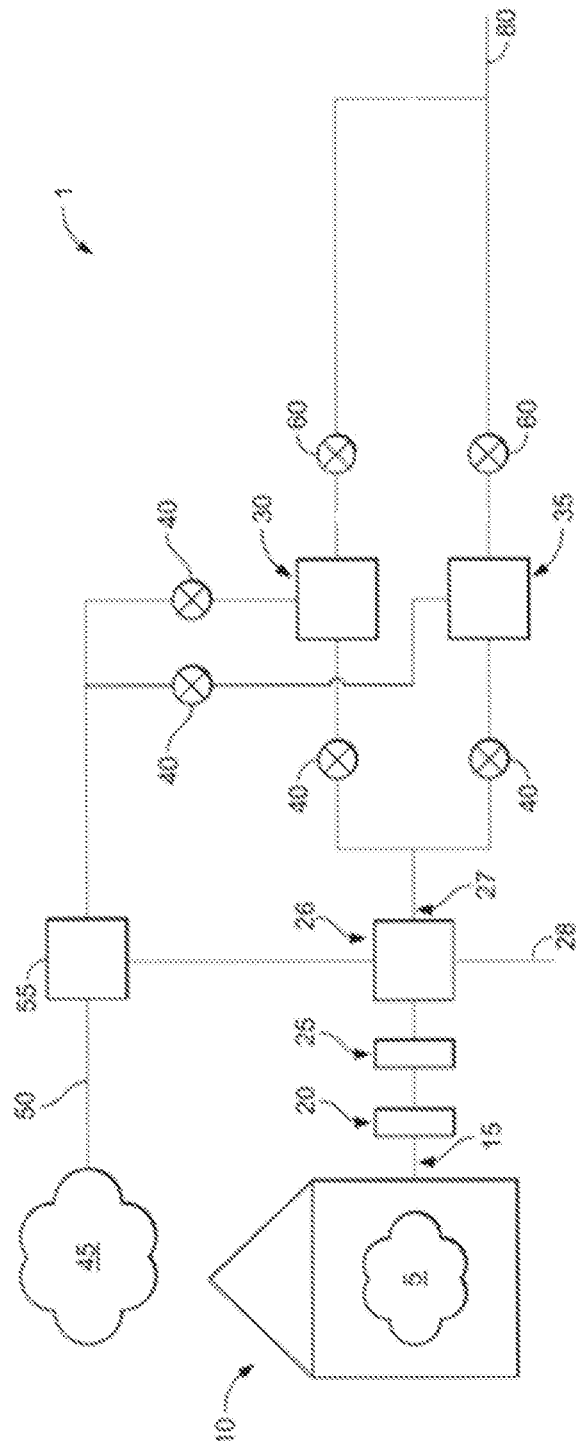

EXHAUST GAS TREATMENT SYSTEM FOR AN AMMONIA-CONTAINING EXHAUST GAS

The present invention relates to a system and method for the treatment of an ammonia-containing exhaust gas. The system and method are particularly useful for treating emissions comprising ammonia which are produced from some sources at low concentrations, such as ammonia produced from livestock houses.

Animals are often reared in a relatively small space such as a barn, coop, or shed ("houses"). This confined space can potentially lead to high concentrations of pollutants in the contained gas atmosphere. Typical pollutants include $NH_3$, VOCs, $H_2S$, bioaerosols such as organic or inorganic particulates which can arise from feed and manure particles and may include bacteria, and the like. Therefore, air quality within the barn is a concern for both animal and workers health. Furthermore, emissions ventilated to the outside can cause problems and may be subject to emissions limits.

For example in poultry rearing, it is required that $NH_3$ should be limited in the poultry breathing air to 25 ppm (OSHA in the US). While this is attainable, concentrations as high as 50-200 ppm are also known. Emissions typically are not constant and increase with number, age and activity of the animals (VDI 4255 part 2).

For animal breeding, the air exchange rate in the barn/house depends on the outside temperatures. In summer exchange rates may be high, whereas in colder whether it typically is very low to avoid generating too much of a draft, which can impact animal health. A low air exchange rate worsens the pollutant concentrations in the air which the animals/workers breathe.

There is a particular focus at the moment on decreasing the pollutant concentrations inside of the barn and also emission to the outside. The current state-of-the-art to minimise these organic and inorganic air pollutants relies on scrubber and biofilter systems which have an associated high investment cost. In operation a relatively high volume of fresh water is used and therefore a high volume of organically-polluted grey water is attained.

DE 4427491 A1 relates to methods for the stationary disposal of sorbable chemical compounds comprising UV photolysis of a fluid stream comprising said compounds and ozone. Undesired by-products of said photolysis such as $NO_x$ may be treated by a catalytic converter.

EP 2581127 A1 relates to a method of air purification whereby pollutants, preferably VOCs, are broken down by means of UV radiation, preferably by means of photo-oxidation and residual pollutants may be oxidised by a catalytic converter.

US 2015/118138 A1 relates to an apparatus and method for decomposing an ultra-low concentration of volatile organic compounds.

Accordingly, it is desirable to provide an improved system and method for treating such exhaust gases and/or to tackle at least some of the problems associated with the prior art or, at least, to provide a commercially viable alternative thereto. In particular, it is an aim to achieve catalytic destruction of pollutants directly in the gas phase for recirculation of the air back to the inside or venting to the outside.

According to a first aspect there is provided a method of treating an ammonia-containing exhaust gas, the method comprising:
(i) providing an exhaust gas treatment system for the treatment of an ammonia-containing exhaust gas, the exhaust gas treatment system comprising:
 a first gas inlet for providing a flow of ammonia-containing exhaust gas;
 a second gas inlet for providing a flow of heated gas;
 a plurality of sorbent beds comprising a copper-doped small-pore zeolite;
 an exhaust gas outlet; and
 a valve system configured to establish independently for each sorbent bed fluid communication in a first or second configuration, wherein:
  i) in the first configuration a flow of ammonia-containing exhaust gas from the first gas inlet contacts the sorbent bed at a temperature of less than 50° C. for storing the ammonia and then passes to the exhaust gas outlet; and
  ii) in the second configuration a flow of heated gas from the second gas inlet contacts the sorbent bed and then passes to the exhaust gas outlet, wherein the flow of heated gas maintains the sorbent bed at a temperature of at least 300° C.;
 wherein the valve system is configured to ensure that at least one sorbent bed is in the first configuration,
 and wherein, the exhaust gas treatment system comprises a control module for controlling the valve system and the flow of heated gas, the control module having an operation mode configured to heat each sorbent bed to the temperature of at least 300° C. with a heating profile reaching 200° C. in 60 minutes or less when switching each sorbent bed from the first configuration to the second configuration,
 wherein the method comprises:
  (i) contacting one or more sorbent beds, each in the first configuration, with a flow of ammonia-containing exhaust gas at a temperature of less than 50° C., thereby storing the ammonia; and
  (ii) intermittently switching at least one sorbent bed from the first configuration to the second configuration to heat the sorbent bed to the temperature of at least 300° C. with a heating profile reaching 200° C. in 60 minutes or less, wherein at least one sorbent bed is in kept in the first configuration.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present inventors have previously described an exhaust system suitable for the treatment of an ammonia-containing exhaust gas, which is the subject of unpublished patent application PCT/EP2021/071983. This system comprised a plurality of sorbent beds for storing ammonia. The ammonia-containing exhaust gas is passed over the sorbent beds for concentration, loading the bed with ammonia and allowing an ammonia-deplete exhaust gas to be released. Once a sorbent bed is filled with ammonia, it is heated to release a concentrated ammonia-containing gas which can then be treated on a separate downstream catalyst. A single catalyst can be used to service the concentrated emissions from multiple sorbent beds, provided that at least one bed is always serving the requirement to capture ammonia from the ammonia-containing exhaust gas been treated.

As will be appreciated, the system of PCT/EP2021/071983 is quite complex and the provision of separate units increases the production and operating costs. The present inventors have now found that surprisingly the use of a copper-containing small-pore zeolite, preferably a copper-containing CHA zeolite, as the sorbent bed allows the ammonia to be both stored and treated in-situ. The zeolite absorbs the ammonia during a storage phase and then, when heated by a flow of heated gas, serves to both release and treat the ammonia in situ on the sorbent bed.

The inventors have found, however, that it is critical in this system to ensure that the heating rate of the sorbent bed is sufficiently fast. That is, the zeolite stores the ammonia at ambient temperatures and temperatures just above ambient. The Cu-containing zeolite treats the ammonia at temperatures in excess of 200° C. and optimally between 300 and 400° C. As the zeolite is heated up to a treatment temperature there is a window between where the ammonia is stored and where it starts to be released from the zeolite. By ensuring that there is a fast temperature increase the time within which the ammonia is being released but not efficiently treated is minimised.

The present invention allows for the direct catalytic treatment of ammonia to be treated in the gas phase. In particular, the invention provides for treatment of ammonia and other airborne pollutants in low concentrations and at low temperature directly in the gas phase of a humid exhaust gas without the use of a liquid phase like in scrubber or biofilter systems. The low temperature catalytic gas treatment system can operate with only electrical power for fans and gas heaters and does not have any constantly-incurred by-products except for spent catalyst.

The present invention relates to a method of treating an ammonia-containing exhaust gas. An exhaust gas is a gas to be emitted or discharged. In the context of the present invention, the exhaust gas is a gas containing a build-up of contaminants, specifically at least ammonia, which needs to be treated to ensure that emissions limits are met, or to ensure that an internal environment is kept at tolerable levels in view of health and safety considerations. In the context of a livestock house (for example, a poultry house or a swine house), the exhaust gas is the air within the house which contains $NH_3$ produced by animals, which is taken out of the house to be processed within the exhaust gas system described herein, either to be emitted to the outside or recycled into the house atmosphere. It is noted that the exhaust gases from livestock houses may be relatively humid, containing water vapour.

An ammonia-containing gas in the context of the present invention comprises at least 5 ppm ammonia, preferably at least 10 ppm, preferably at least 20 ppm, preferably at least 30 ppm, preferably at least 50 ppm, preferably at least 100 ppm, preferably at least 150 ppm. Generally the ammonia-containing gas will contain less than 1000 ppm ammonia, preferably less than 750 ppm, preferably less than 500 ppm, preferably less than 500 ppm, preferably less than 250 ppm.

Once the method has been performed there will be produced a treated gas which leaves via the exhaust gas outlet. This may be returned to the original source of the ammonia-containing exhaust gas, or released to the atmosphere. In the former case this is desirable as it helps to retain heat in the system. In the latter case, the gas release must meet strict emissions standards. Preferably the treated gas has an ammonia content which is less than 50 ppm, more preferably less than 25 ppm, more preferably less than 10 ppm, more preferably less than ppm and most preferably less than 4 ppm.

Generally the process is suitable to reduce the observed ammonia levels between the ammonia-containing gas at the first gas inlet and the treated gas at the exhaust gas outlet by at least 75 wt %, more preferably at least 90 wt %, more preferably at least 95 wt % and most preferably at least 99 wt %.

The ppm concentrations of the ammonia may of course fluctuate because of the natural source of the ammonia to be treated. The above ranges for concentrations are the average concentrations over the operating period of the exhaust gas system, excluding any start-up or warm-up period required for the system.

The method comprises providing an exhaust gas treatment system for the treatment of an ammonia-containing exhaust gas. The system comprises the components discussed below and when operated serves to treat the ammonia-containing exhaust gas to achieve the discussed reduction in ammonia content.

This exhaust system will now be discussed in more detail. As noted below, a further aspect of the invention is directed to the exhaust system per se and all of the described features apply equally to that embodiment. This system is particularly advantageous for treating gases which are provided at low temperatures (such as at or around ambient) and at low concentrations (even down to 10 s of ppm levels). The following discussion will focus generally on ammonia treatment of gases from livestock houses, but it should be appreciated that the application of the system can be more broadly applied as noted below.

The exhaust gas treatment system comprises a first gas inlet for providing a flow of ammonia-containing exhaust gas. The first gas inlet provides the exhaust gas to be treated (specifically the ammonia-containing exhaust gas). The exhaust gas is taken from an atmosphere containing ammonia to be treated, such as a livestock house. The exhaust gas may be drawn into the inlet with a fan, and typically involves a conventional air intake within, for example, a livestock house air handling system.

The first gas inlet will provide gas at the ambient temperature of the source gas. In the context of a livestock house, this will typically be from 10 to 40° C. Preferably the exhaust gas entering the system is at a temperature at least 25° C. below an effective catalyst treatment temperature on the sorbent bed and preferably is at ambient temperature.

The exhaust gas treatment system comprises a second gas inlet for providing a flow of heated gas. The second gas inlet may draw in fresh air from outside of the system or may also rely on a flow of exhaust gas taken in from the atmosphere containing ammonia to be treated which may optionally have been dehumidified by a dehumidifier system. There are advantages to drawing in fresh air since this avoids contacting contaminants with the source of heat. For example, if an electrical induction heater is used, this can become degraded with airborne contaminants during use.

Where the second gas inlet provides a flow of heated exhaust gas (rather than fresh air), the first and second gas inlets are preferably split from a single gas inlet. That is, a single exhaust gas stream is divided, such as with a y-shaped tubing configuration, to provide the first and second gas inlets as different forks in the gas flow path. Thus, the single gas inlet draws in the exhaust gas to be treated from the atmosphere, optionally via a dehumidifier system, containing the ammonia to be treated and divides it into two, passing a portion to the first inlet and a portion to the second inlet. This is advantageous since a single intake can be relied upon with a single fan to circulate the gases.

Preferably the second gas inlet incorporates a heating device for providing the flow of heated gas. Preferably the heating device is configured to provide a flow of gas at a temperature of at least 300° C., preferably 350 to 600° C., preferably 350 to 500° C. The target temperature will depend on the heat needed to treat the ammonia on the sorbent bed.

The heater can be electrical or based on combustion of a fuel. Preferably the heater is a gas burner, preferably a propane, natural gas or biogas burner. These are useful especially for locations such as livestock houses, since there tend to be available supplies of propane and the like on such sites. In one embodiment, propane may be supplied with gas from the exhaust gas outlet as an oxygen source for combustion. Such an afterburner serves to further purify the gas being treated.

Preferably, the flow of heated gas is heated with heat obtained from the catalytic treatment of the ammonia with the copper-doped small-pore zeolite (discussed below). By recycling the heat obtained from the exothermic decomposition of the ammonia, the system can be maintained in an autothermal condition. In other words, the system can operate continuously without requiring any input of heat from an external heater but solely from the heat generated by the catalytic decomposition further improving the efficiency of system. This is particularly effective where the flow of heated exhaust gas is dehumidified exhaust gas as the inventors found that the absence of moisture increased the efficiency of heating the exhaust gas.

Accordingly, with improved energy recycling, sufficient heat may be retained from the catalytic treatment and transferred to exhaust gas to be treated so as to maintain autothermal conditions.

The exhaust gas treatment system comprises a plurality of sorbent beds comprising a copper-doped small-pore zeolite. The sorbent beds are used to accumulate the ammonia, allowing it to be stored under normal flow conditions. When the bed is heated it releases and simultaneously treats the stored material under a conventional SCR reaction pathway. Compared to their previous system, the present system can more readily be operated with only two sorbent beds (or perhaps three), such that the complexity of the system can be further reduced.

Zeolites are constructed of repeating $SiO_4$, $AlO_4$, tetrahedral units linked together, for example in rings, to form frameworks having regular intra-crystalline cavities and channels of molecular dimensions. The specific arrangement of tetrahedral units (ring members) gives rise to the zeolite's framework, and by convention, each unique framework is assigned a unique three-letter code (e.g., "CHA") by the International Zeolite Association (IZA). Zeolites may also be categorised by pore size, e.g. a maximum number of tetrahedral atoms present in a zeolite's framework. As defined herein, a "small pore" zeolite, such as CHA, contains a maximum ring size of eight tetrahedral atoms, whereas a "medium pore" zeolite, e.g. MFI, contains a maximum ring size of ten tetrahedral atoms; and a "large pore" zeolite, such as BEA, contains a maximum ring size of twelve tetrahedral atoms.

Small pore zeolites are more selective for ammonia and so may reduce competition for ammonia storage when other gaseous species are present. The zeolite is loaded (for example, ion-exchanged) with copper. Preferably the small-pore zeolite has a framework structure selected from the group consisting of AEI, AFT, AFV, AFX, AVL, CHA, EMT, GME, KFI, LEV, LTN, and SFW, including mixtures of two or more thereof. It is particularly preferred that the zeolite has a CHA or AEI-type framework structure. The zeolite preferably has a metal-loading in the range 1 to 6 wt %, preferably 2-5 wt %, preferably 3-5.5 wt % and most preferably about 4 wt %.

The copper-doped small-pore zeolite may preferably be disposed on a suitable substrate such as a honeycomb monolith, a corrugated substrate (such as corrugated glass-paper or quartz fibre sheet) or a plate. Alternatively, the copper-doped small-pore zeolite itself may be extruded in the form of a monolith or in the form of pellets or beads. For example, the sorbent material may comprise a packed bed of sorbent bead material. The nature of the sorbent material will depend on the backpressure requirements of the system.

Most preferably the sorbent material comprises the copper-doped small-pore zeolite and one or more further zeolites or activated carbon. Preferably the sorbent material comprises a mixture of two or more zeolites. These may be provided in a zoned configuration with different zeolites in different regions of the storage material.

In an embodiment the sorbent bed comprises two different sorbent materials for different species to be treated (i.e. the copper-doped small-pore zeolite and another sorbent). For example, the system may be configured to treat ammonia and VOCs simultaneously. The material suitable for the storage of volatile organic compounds (VOC) may be the same material for the storage of ammonia, or a further material may be provided which has better storage performance for VOCs than ammonia. For example, a suitable material for the storage of a VOC would be a medium or large pore zeolite. Therefore, a mixture (in a mixed, zoned or layered configuration) of the small pore zeolite (for ammonia) and a medium/large pore zeolite (for VOCs) could be provided. Examples of preferred large pore zeolites include zeolite Y and Beta. In such embodiments the VOCs will be released at the same time and decomposed with the copper-doped small-pore zeolite.

The number of sorbent beds required will depend on the size of the sorbent beds and the amount of the ammonia to be treated. It may, for example, be desirable to have a large number of sorbent beds, but only have a subset in use. This will allow the capacity of the system to scale, for example to scale with animals as they age and produce more ammonia.

When heated with the flow of heated gas, the copper-doped small-pore zeolite is able to decompose the ammonia. By the term, "decomposing" it is meant that the ammonia is treated so as to be converted into one or more other chemical species. The decomposed ammonia is preferably converted so as to become one or more less harmful chemical species, such as into nitrogen and water.

The present invention finds particular application in the treatment of an exhaust gas comprising ammonia since the inventors have found that a catalyst as described herein may be used to convert the ammonia into essentially nitrogen gas ($N_2$) and water ($H_2O$). On the contrary, known systems based on UV oxidation with ozone and photolysis result in the complete oxidation of any nitrogen present in the exhaust stream which leads to the generation of harmful nitrogen oxides ($NO_x$) which is advantageously avoided using the present system.

Accordingly, it is preferred that the exhaust system does not comprise a photoreactor, a means for generating UV light or a means for generating ozone. It follows that the method preferably does not comprise photolysis or ozonolysis (i.e. suppling ozone for the oxidation of the ammonia).

The exhaust gas treatment system comprises an exhaust gas outlet. The exhaust gas outlet is for gas flowing simply past the sorbent bed, so that the gas passing out of the outlet has had the ammonia adsorbed into the sorbent bed. The exhaust gas outlet is also for gas flowing away from the sorbent bed when it has been heated to a treatment temperature, so that the ammonia has been decomposed. In both cases the gas leaving the gas outlets is depleted of ammonia.

The exhaust gas treatment system comprises a valve system configured to establish independently for each sorbent bed fluid communication in a first or second configuration, In the first configuration a flow of ammonia-containing exhaust gas from the first gas inlet contacts the sorbent bed at a temperature of less than 50° C. for storing the ammonia and then passes to the exhaust gas outlet.

In the second configuration a flow of heated gas from the second gas inlet contacts the sorbent bed and then passes to the exhaust gas outlet, wherein the flow of heated gas maintains the sorbent bed at a temperature of at least 300° C.

The valve system is configured to ensure that at least one sorbent bed is in the first configuration. Preferably at least one other sorbent bed is in the second configuration. As will be appreciated, the first configuration will result in the ammonia being stored within the sorbent bed, whereas the second configuration will result in the ammonia being released from the sorbent bed and treated in situ.

It should of course be appreciated that this configuration is contemplated for the system when in operation, whereas during start-up or under certain conditions it may be required that all of the sorbent beds are in the first configuration storing the ammonia so that there is a sufficient quantity to be treated. For example, if it takes 24 hours to charge a sorbent bed, but one hour to discharge the sorbent bed, then each bed will have non-overlapping discharging windows, but overlapping charging windows.

Preferably the valve system is further configured to establish independently for each sorbent bed fluid communication a third configuration for cooling of the sorbent bed, wherein gases are prevented from leaving the sorbent bed until it is at a temperature below 50° C. This is a desirable option because it prevents a circumstance whereby the sorbent bed is connected to the outlet but is still releasing some of the ammonia and there is a risk of undesirable ammonia slip from the system. In an embodiment with three beds there would be one bed discharging, one bed cooling and one bed recharging, or one bed discharging and two beds recharging.

The exhaust gas treatment system further comprises a control module for controlling the valve system and the flow of heated gas, the control module having an operation mode configured to heat each sorbent bed to the temperature of at least 300° C. with a heating profile reaching 200° C. in 60 minutes or less when switching each sorbent bed from the first configuration to the second configuration Preferably the flow of heated gas maintains the sorbent bed at a temperature of at least 350° C. Preferably the heating profile reaches 200° C. in less than 15 minutes, preferably less than 10 minutes. Preferably the heating profile reaches 300° C. from 200° C. in less than 30 minutes, more preferably less than 15 minutes.

Preferably at least 80 wt % of the stored ammonia is desorbed and decomposed, more preferably at least 90 wt % and most preferably at least 95 wt %. This is controlled by ensuring that the temperature is increased sufficiently quickly such that the zeolite is catalytically active before the majority of the ammonia is desorbed therefrom.

The method comprises contacting one or more sorbent beds, each in the first configuration, with a flow of ammonia-containing exhaust gas at a temperature of less than 50° C., thereby storing the ammonia. The method comprises intermittently switching at least one sorbent bed from the first configuration to the second configuration to heat the sorbent bed to the temperature of at least 300° C. with a heating profile reaching 200° C. in 60 minutes or less, wherein at least one sorbent bed is in kept in the first configuration.

Preferably the exhaust gas treatment system further comprises a dehumidifier, and wherein the flow of ammonia-containing exhaust gas from the first gas inlet is treated by the dehumidifier before it contacts each sorbent bed in the first configuration.

That is, the dehumidifier system when present is arranged upstream of the valve system and sorbent beds and provides a flow of dehumidified exhaust gas to the remainder of the exhaust system by dehumidifying a humid exhaust gas comprising the ammonia. The dehumidifier comprises a humid air inlet for providing a flow of humid exhaust gas (such as an exhaust gas from a livestock house comprising ammonia). The dehumidifier provides a flow of dehumidified exhaust gas to the first gas inlet of the exhaust system of the invention.

The dehumidifier system is for removing water independently of other gases. By removing water from, for example, livestock house air, ventilation and water concentration can be decoupled. Through the decoupling of water from livestock house air, energy savings, particularly in cooler temperatures, can be increased by reducing the air purge from the house while the water vapour concentration still remains at a low enough level where livestock health and value are not impacted.

By selectively removing water (in addition to the ammonia in a separate step), the amount of purged air can be reduced, meaning less fresh air is required to be brought in the house which results in lower heating costs.

The inventors have found that the moisture content of an exhaust gas inhibits the mechanism of the other treatment systems. For example, moisture has been found to reduce catalyst performance by blocking active sites. In terms of heating efficiency, the inventors have also found that increased energy was required to heat humid exhaust gas reducing the overall efficiency of the system.

Preferably the system comprises one or more fans to push or pull gases through the system. The configuration of such a fan will depend on the desired air exchange rate required in the atmosphere to be treated.

Preferably the system further comprises one or more material filters to pre-filter the exhaust gas. Such filters are for recovering matter which could enter the system and clog or degrade the components of the system. For example, for poultry houses, there is a risk of feathers, fluff, straw and dust to be entrained into the air system which can be removed by such filters. Accordingly, it is preferred that such a filter is upstream of the gas inlet and, where present, a dehumidifier. Thus, preferably the ammonia-containing exhaust gas is filtered before contacting the sorbent beds.

Preferably the system comprises a sorbent material for further contaminants upstream of the plurality of sorbent beds, wherein the further contaminant is selected from one or more of As, $SO_2$, $SO_3$, $H_2S$, Hg and Cl. By Hg and Cl it is meant any suitable mercury-containing and chlorine-containing species, respectively. Such contaminants are desirably removed in order to ensure that the one or more catalysts are not poisoned. Thus, preferably, the ammonia-containing exhaust gas is treated with the contaminant sorbent material before contacting the sorbent beds Preferably the system further comprises one or more ammonia sensors communication with each sorbent bed to determine an ammonia loading status. This can be used to control the valve system to ensure that beds are discharged before they become over full. Thus, the sensor detects the loading status and changes to a further flow path to store the pollutant in the storage medium when the Emission Limit of the pollutant in question over the storage medium is reached. By the term "ammonia sensor" it is meant any sensor that is capable of providing an indication of ammonia loading levels. A preferred sensor is an automotive $NO_x$ sensor since these are not expensive and since they cannot distinguish between $NH_3$ and $NO_x$, where only $NH_3$ is present, the output of the $NO_x$ sensor gives an indication of $NH_3$ levels. Such sensors are well known in the art. By determining the ammonia loading status it is possible to establishes when the control module should reconfigure the valve system and thereby move each bed individually between the modes of operation.

One or more of the filters described herein may comprise copper. Copper is known to have an antiviral effect. Thus, the presence of the copper in the system to contact the exhaust gas may have an antiviral effect which could reduce transmission of viruses via the exhaust gas.

According to a further aspect the present invention provides an exhaust gas treatment system for the treatment of an ammonia-containing exhaust gas. This system is as described above in relation to the method and is suitable for us in putting the method into effect.

According to a further aspect there is provided a livestock house, HVAC installation, waste water treatment plant, or a mine, comprising the exhaust gas treatment system described herein.

The invention will now be described in relation to the following non-limiting figures, in which:

FIG. 1 shows a schematic of an exhaust system.

FIG. 1 shows an exhaust gas system 1 as described herein. The exhaust gas system 1 is configured to process an ammonia-containing exhaust gas 5 from a livestock house 10. The ammonia-containing exhaust gas 5 passes through an exhaust gas inlet 15 into the exhaust gas treatment system 1.

The ammonia-containing exhaust gas 15 passes through a coarse material filter 20 to remove matter such as poultry feathers and then through a $H_2S$ sorbent filter 25. The ammonia-containing exhaust gas 5 then passes to a dehumidifier system 26 so as to remove the moisture from the ammonia-containing exhaust gas 5. The moisture is recovered from drain 28. The dehumidifier system 26 passes a flow of dehumidified ammonia-containing exhaust gas to the remainder of the exhaust system 1 via a first gas inlet 27. The dehumidified ammonia-containing exhaust gas passes through the first gas inlet 27 to either a first sorbent bed 30 or a second sorbent bed 35, depending on the configuration of the valve system comprising valves 40.

Each sorbent bed comprises a copper-loaded CHA zeolite, such as SSZ-13 loaded with 3-4 wt % copper.

A source of fresh air 45 is fed through a fresh air inlet 50 to a propane heater 55. Depending on the valve system, the heated fresh air passes to either the first sorbent bed 30 or the second sorbent bed 35.

The valves 40 of the valve system is configured so that one of the first sorbent bed 30 and the second sorbent bed 35 receives the dehumidified ammonia-containing exhaust gas 5 and the other receives the heated fresh air 45.

A further valve system comprising further valves 60 is provided to direct the gas leaving the first sorbent bed 30 to a further exhaust gas outlet 80 or to close the first sorbent bed 30 so that gases cannot leave. At the same time the further valves 60 are configured to direct the gas leaving the second sorbent bed 35 in the same way.

In one embodiment gas leaving the catalyst-treated exhaust gas outlet 80 may be recycled to the heater 55 as a combustion gas.

In one embodiment gas leaving the sorbent beds 30, 35 may be recycled into the house 10.

In use, ammonia-containing exhaust gas 15 is passed from the inlet 27 through each of the sorbent beds 30, 35 to accumulate ammonia on each bed. When one of the sorbent beds 30, 35 is fully loaded, which can be determined by assessing ammonia slip on a downstream ammonia sensor, the valve system is adapted, by reconfiguring the valves 40, so that the flow of ammonia-containing exhaust gas 15 is stopped from entering the loaded sorbent bed 30, 35. Instead, a flow of heated fresh air 45 is passed to the loaded sorbent bed 30, 35 to thereby increase its temperature. This causes the stored ammonia to be released and it is then treated in situ by the heated zeolite material of the sorbent bed 30, 35.

The rate of heating of the sorbent bed 30, 35 is determined by the heat of the heated gas flow and the thermal mass of the sorbent bed 30, 35. Nonetheless it is important that the rate of heating is fast, so that there is not significant ammonia slip as the zeolite reaches a catalytically active temperature. The desired catalyst temperature is greater than 300° C., but the critical temperature is 200° C. at which catalytic activity starts to be observed. Therefore the heating rate up to 200° C., from the storage temperature (preferably ambient temperature in the gas source) is preferably such that 200° C. is achieved in less than 1 hour.

Once the stored ammonia has been treated, the valve system 40, 60 is reconfigured to ensure that the flow of gas through the sorbent bed 30, 35 is prevented until the sorbent bed 30, 35 has cooled to a temperature whereby it is capable of storing ammonia again. At this point the valve system 40, 60 is reconfigured to allow a flow of ammonia-containing exhaust gas 15 through the sorbent bed 30, 35.

It is important that there is always a sorbent bed 30, 35 in a configuration whereby it can store ammonia from the ammonia-containing exhaust gas 15. This ensures that a flow can be continuously treated.

Although preferred embodiments of the invention have been described herein in detail, it will be understood by those skilled in the art that variations may be made thereto without departing from the scope of the invention or of the appended claims.

The invention claimed is:

1. A method of treating an ammonia-containing exhaust gas, the method comprising:
   (i) providing an exhaust gas treatment system for the treatment of an ammonia-containing exhaust gas, the exhaust gas treatment system comprising:
   a first gas inlet for providing a flow of ammonia-containing exhaust gas;
   a second gas inlet for providing a flow of heated gas;
   a plurality of sorbent beds comprising a copper-doped small-pore zeolite;
   an exhaust gas outlet; and
   a valve system configured to establish independently for each sorbent bed fluid communication in a first or second configuration, wherein:
   i) in the first configuration a flow of ammonia-containing exhaust gas from the first gas inlet contacts the sorbent bed at a temperature of less than 50° C. for storing the ammonia and then passes to the exhaust gas outlet; and
   ii) in the second configuration a flow of heated gas from the second gas inlet contacts the sorbent bed and then passes to the exhaust gas outlet, wherein the flow of heated gas maintains the sorbent bed at a temperature of at least 300° C.;

wherein the valve system is configured to ensure that at least one sorbent bed is in the first configuration, and wherein, the exhaust gas treatment system comprises a control module for controlling the valve system and the flow of heated gas, the control module having an operation mode configured to heat each sorbent bed to the temperature of at least 300° C. with a heating profile reaching 200° C. in 60 minutes or less when switching each sorbent bed from the first configuration to the second configuration, wherein the method comprises:
  (i) contacting one or more sorbent beds, each in the first configuration, with a flow of ammonia-containing exhaust gas at a temperature of less than 50° C., thereby storing the ammonia; and
  (ii) intermittently switching at least one sorbent bed from the first configuration to the second configuration to heat the sorbent bed to the temperature of at least 300° C. with a heating profile reaching 200° C. in 60 minutes or less, wherein at least one sorbent bed is in kept in the first configuration.

2. The method according to claim 1 wherein the copper-doped small-pore zeolite has a CHA or AEI-type framework structure.

3. The method according to claim 1, wherein the exhaust gas treatment system further comprises a dehumidifier, and wherein the flow of ammonia-containing exhaust gas from the first gas inlet is treated by the dehumidifier before it contacts each sorbent bed in the first configuration.

4. The method according to claim 1, wherein the copper-doped small-pore zeolite is doped with copper in an amount of from 1 to 6 wt %.

5. The method according to claim 1, wherein the exhaust gas treatment system comprises only two sorbent beds.

6. The method according to claim 1, wherein the flow of heated gas maintains the sorbent bed at a temperature of at least 350° C.

7. The method according to claim 1, wherein the flow of ammonia-containing exhaust gas from the first gas inlet contacts the sorbent bed at a temperature of from 10° C. to 30° C.

8. The method according to claim 7, wherein the ammonia-containing exhaust gas is a livestock house exhaust gas.

9. The method according to claim 1, wherein the flow of heated gas is heated by a hydrocarbon gas burner.

10. The method according to claim 1 wherein the exhaust gas treatment system further comprises one or more material filters and wherein the ammonia-containing exhaust gas is filtered before contacting the sorbent beds.

11. The method according to claim 1 wherein the exhaust gas treatment system further comprises a contaminant sorbent material upstream of the plurality of sorbent beds, wherein the contaminant is selected from one or more of As, $SO_2$, $SO_3$, $H_2S$, Hg and Cl, wherein the ammonia-containing exhaust gas is treated with the contaminant sorbent material before contacting the sorbent beds.

12. The method according to claim 1 wherein the exhaust gas treatment system further comprises one or more ammonia sensors in communication with each sorbent bed to determine an ammonia loading status for establishing when the control module should reconfigure the valve system.

13. The method according to claim 1, wherein the valve system is further configured to establish, independently for each sorbent bed, fluid communication in a third configuration, wherein:
  (iii) in the third configuration for cooling of the sorbent bed gases are prevented from leaving the sorbent bed until it is at a temperature below 50° C.

14. The method according to claim 1, wherein:
  (i) the heating profile reaches 300° C. from 200° C. in less than 30 minutes and/or
  (ii) the heating profile reaches 200° C. in less than 10 minutes.

15. An exhaust gas treatment system for the treatment of an ammonia-containing exhaust gas, the exhaust gas treatment system comprising:
  a first gas inlet for providing a flow of ammonia-containing exhaust gas;
  a second gas inlet for providing a flow of heated gas;
  a plurality of sorbent beds comprising a copper-doped small-pore zeolite;
  an exhaust gas outlet; and
  a valve system configured to establish independently for each sorbent bed fluid communication in a first or second configuration, wherein:
    i) in the first configuration a flow of ammonia-containing exhaust gas from the first gas inlet contacts the sorbent bed at a temperature of less than 50° C. for storing the ammonia and then passes to the exhaust gas outlet; and
    ii) in the second configuration a flow of heated gas from the second gas inlet contacts the sorbent bed and then passes to the exhaust gas outlet, wherein the flow of heated gas maintains the sorbent bed at a temperature of at least 300° C.;
  wherein the valve system is configured to ensure that at least one sorbent bed is in the first configuration,
  and wherein, the exhaust gas treatment system comprises a control module for controlling the valve system and the flow of heated gas, the control module having an operation mode configured to heat each sorbent bed to the temperature of at least 300° C. with a heating profile reaching 200° C. in 60 minutes or less when switching each sorbent bed from the first configuration to the second configuration.

16. The exhaust gas treatment system according to claim 15, wherein the copper-doped small-pore zeolite has a CHA or AEI-type framework structure.

17. The exhaust gas treatment system according to claim 15, wherein the exhaust gas treatment system is for performing the method according to claim 1.

18. A livestock house, HVAC installation, waste water treatment plant, or a mine, comprising the exhaust gas treatment system according to claim 15.

* * * * *